UNITED STATES PATENT OFFICE.

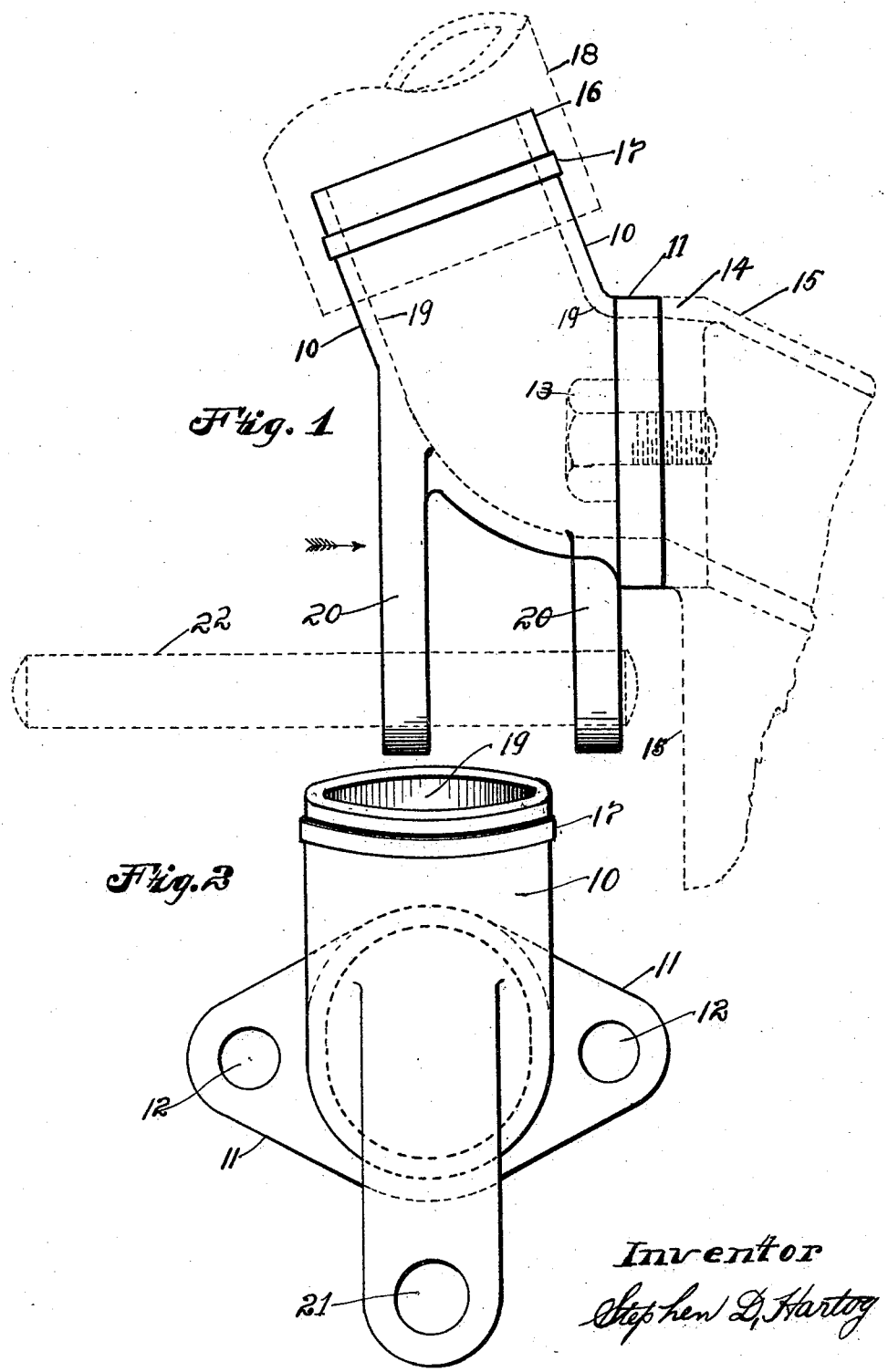

STEPHEN D. HARTOG, OF ST. LOUIS, MISSOURI.

ELBOW FITTING FOR ENGINES.

1,412,055.

Specification of Letters Patent.  Patented Apr. 11, 1922.

Application filed April 27, 1920. Serial No. 377,107.

*To all whom it may concern:*

Be it known that I, STEPHEN D. HARTOG, a citizen of the United States, and a resident of the city of St. Louis and State of Missouri, have invented new and useful Improvements in Elbow Fittings for Engines, of which the following is a specification.

This invention relates to an elbow fitting for engines, more particularly to the character of elbows as used on the cylinder head portion of internal combustion engines. The present type of elbows in common use are employed as a connecting member between the cylinder head of the internal combustion engine and radiator, connecting the cylinder head with the radiator through which the water cooling medium has passage.

It is a well known fact that very useful devices could be economically employed and operated by the engine were a convenient place provided on the engine for their attachment if it were not, as is now the case, of having to resort to the expense and difficulty in forming special brackets and drilling and tapping special holes in different places about the engine for these attachable parts.

The object therefore of the present invention is to provide a place or location very conveniently and inexpensively so that suitable and useful devices may readily be attached and detached without practically any loss of time or any appreciable expense.

To such ends this invention consists in constructing an elbow in such a novel way whereby provision is made enabling the elbow to support a shaft or stud, or to be employed as a hanger support for devices attachable thereto, by forming projecting portions or prongs integral with the body of the elbow without altering the size or form of the elbow proper from the size and form now in common use.

To the end that others may make and use this invention the following description is given supplemented by the accompanying drawing in which:

Fig. 1 is a side elevation illustrating the manner in which the elbow is attached.

Fig. 2 is a front view of the elbow looking in the direction of the arrow Fig. 1.

In the drawing, 10 designates the body of the elbow having a flanged end 11, through which holes 12 are drilled to receive bolts 13 (shown in dotted outline), two of which are used to screw into holes tapped in a corresponding flanged end of the upper end of the cylinder head 14 (shown in dotted outline 15) and to which the elbow 10 is clamped.

The end 16 of the elbow, opposite the flanged end 11, is formed with a beading or ridge 17 of very narrow width and slightly larger in diameter than the diameter of the body of the elbow 10. Over the end 16 a short length of hose 18 (shown in dotted outline) is pressed and into which the beading 17 is adapted to make an impression forming a seat to prevent leakage when clamped by a metal band (not shown) positioned on the outer surface of the hose connection 18. The internal portion of the elbow 10 is cored through its entire length, as indicated at 19.

The foregoing description is of the elbow 10 as it is in common use and for which no claim for novelty or invention is made except in combination with and as a unitary structure as herein next described. Projecting portions or prongs 20 are formed or cast integrally with the body 10 of the elbow, providing an additional capacity to the elbow 10, enhancing its usefulness, in that the projecting portions can be drilled or tapped at 21 to support a shaft 22 (shown in dotted outline) or the projecting portion may otherwise be converted into a hanger support for any suitable device attachable thereto. The advantage, convenience and economy of having a location to make attachable connections with operable parts of the engine which the position of the elbow affords when provided with the means for acomplishing this end cannot be overstated.

In the manufacturing of my improved elbow the first requirement is to have a pattern made of the requisite size and shape from which castings are made in duplicate. The castings are then machined on the connecting face of the flanged end 11 of the body 10; holes are drilled in the flanged end 11 to mate with the holes as drilled and tapped in the flanged end 14 of the cylinder head 15, and holes 21 are then drilled and tapped, as the case may require, in the projecting portions or prongs 20 for the purpose of supporting a shaft or stud or other suitable parts as hereinbefore explained.

It is obvious from the foregoing description that this construction of elbow fulfils the purpose for which it is intended and it is to be understood that minor changes may be made in the size, form and shape of this structure without departing from the spirit of this invention within the scope of the appended claims.

Having thus described the invention what I claim and desire to secure by Letters Patent is:

1. As a new article of manufacture, a connecting member for connecting the cylinder head of an internal combustion engine with the radiator, having projecting portions or prongs adapted to form a support for parts attachable thereto.

2. As a new article of manufacture, a connecting member for connecting the flanged end of a cylinder head of an internal combustion engine with the radiator, having projecting portions or prongs adapted to form a support for parts attachable thereto, and operable by the engine.

3. As a new article of manufacture, an elbow fitting for the flanged end of the cylinder head of an internal combustion engine, forming a connection with the radiator, said elbow being provided with projecting portions adapted to form a support for parts attached thereto.

4. As a new article of manufacture an elbow fitting employed as the connecting member between the flanged end of the cylinder head of the internal combustion engine and the connecting end of the radiator and positioned therebetween, projecting portions on said elbow adapted to form a support or hanger for parts attachable thereto and operable by said engine.

In confirmation hereof I hereto attach my signature.

STEPHEN D. HARTOG.